Figure 1:
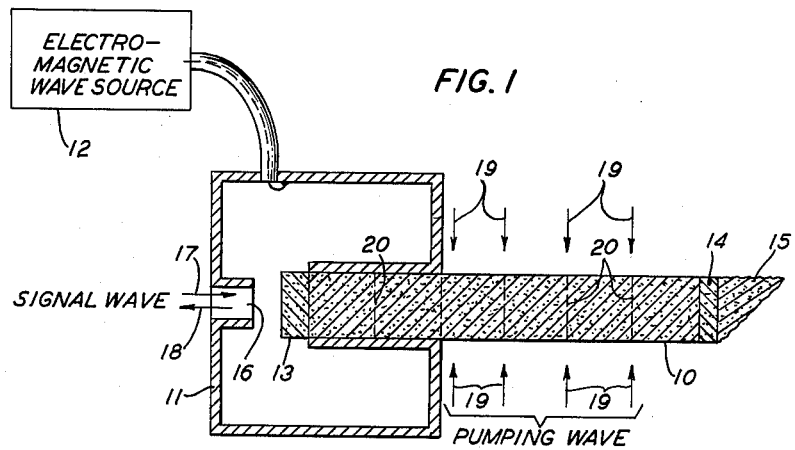

Sept. 7, 1965 A. ASHKIN ETAL 3,205,370
STABILIZED OPTICAL MASER AMPLIFIER
Filed Feb. 23, 1962 2 Sheets-Sheet 1

$f_2 = f_1 - f_{ac}$
$f_3 = f_1 - 2f_{ac}$
$f_4 = f_1 - 3f_{ac}$
$f_{m+1} = f_1 - mf_{ac}$

MASER RESPONSE

INVENTORS A. ASHKIN
P. K. TIEN
BY
ATTORNEY

Sept. 7, 1965          A. ASHKIN ETAL          3,205,370
STABILIZED OPTICAL MASER AMPLIFIER
Filed Feb. 23, 1962          2 Sheets-Sheet 2
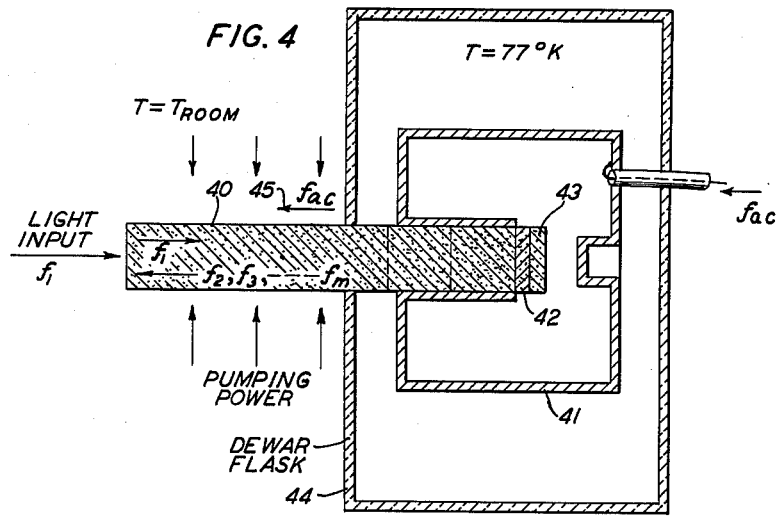
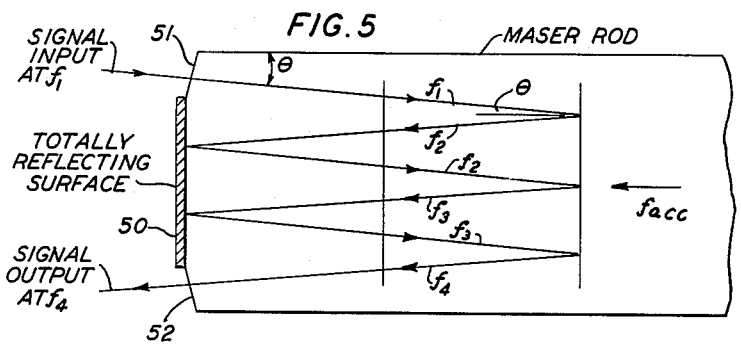
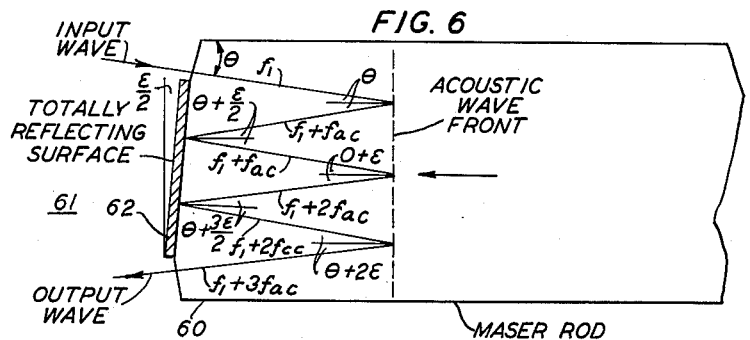
INVENTORS   A. ASHKIN
              P. K. TIEN
BY
*Sylvan Sherman*
ATTORNEY 3,205,370
STABILIZED OPTICAL MASER AMPLIFIER
Arthur Ashkin, Bernardsville, and Ping K. Tien, Chatham Township, Morris County, N.J., assignors to Bell Telephone Laboratories, Incorporated, New York, N.Y., a corporation of New York
Filed Feb. 23, 1962, Ser. No. 175,101
13 Claims. (Cl. 307—88.3)

This invention relates to electromagnetic wave devices and, more particularly, to maser amplifiers for the amplification of wave energy in the infrared, visible and ultraviolet frequency range.

Means for generating electromagnetic waves in the infrared, visible and ultraviolet frequency range, hereinafter to be referred to collectively as the optical range, have been disclosed in United States Patent 2,929,922 issued to A. L. Schawlow et al. and in the copending United States application of A. Javan, Serial No. 816,276 filed May 26, 1959 and now abandoned. Wave energy generated in the manner explained by Schawlow et al. and by Javan is characterized by a high degree of monochromaticity and coherency. In addition, because of the very high frequency of wave energy in the optical portion of the frequency spectrum, such wave energy is capable of carrying enormous amounts of information and is, therefore, particularly useful as a transmission medium in a communication system. However, efficient utilization of this great potential is dependent upon the availability of means for amplifying wave energy at these very high frequencies.

It has been proposed to utilize the techniques of the maser oscillator to produce amplification. In such an arrangement wave energy (light) is passed through an active material in which there is established a nonequilibrium population distribution in a pair of spaced energy levels of its energy level system. In a maser, however, both the forward and backward traveling waves are amplified. Accordingly, in the absence of nonreciprocal loss the maximum permissible gain of such an amplifier is limited by the input and output matches. Specifically, in order to stay below the threshold for oscillation, it is necessary that the gain be less than $$\frac{1}{R}$$

where R is the fraction of the power reflected at the matches.

It is, therefore, a more specific object of the invention to stably amplify electromagnetic wave energy in a traveling wave maser amplifier in which both the gain and the reflected power can be made arbitrarily large.

In the usual maser amplifier, the forward and backward traveling waves are at the same frequency. If the length of the active maser material is right, the waves add in phase and oscillation can build up. In accordance with the invention, a maser amplifier is stabilized by exciting the maser material by means of a traveling acoustic wave which serves as a plurality of moving discontinuities from which the electromagnetic signal wave energy is reflected. The reflected electromagnetic wave energy, however, is Doppler-shifted in frequency so that regardless of the number of times the wave energy traverses the maser material and regardless of the over-all gain produced, oscillations cannot occur. Thus, an amplifier constructed in accordance with the teachings of the invention is unconditionally stable having an inherent form of nonreciprocal behavior. It should be noted, however, that the amplified output signal is shifted in frequency with respect to the input signal by an amount equal to an integral multiple of the frequency of the acoustic wave. However, because of the extremely high frequency of the signal wave, this shift in frequency is relatively small.

Figure 2:
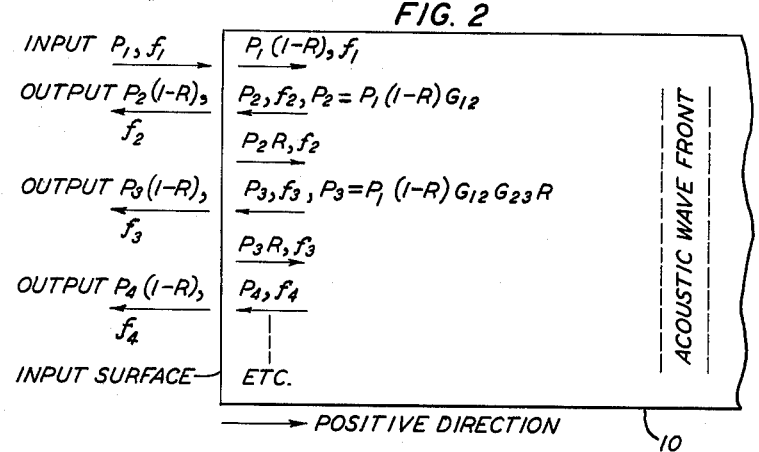
Figure 3:
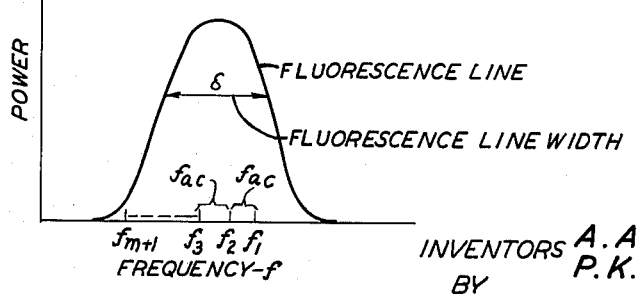

These and other objects and advantages, the nature of the present invention, and its various features, will appear more fully upon consideration of the various illustrative embodiments now to be described in detail in connection with the accompanying drawings, in which:

FIG. 1 shows a first embodiment of the invention;
FIG. 2 shows, for purposes of explanation, the power and frequency components of the signal wave energy at the input end of the maser rod;
FIG. 3 shows graphically the location of the various signal components with respect to the fluorescence line of the maser amplifier;
FIG. 4 shows a second embodiment of the invention;
FIG. 5 shows an alternate arrangement in which the signal wave and the acoustic wave are directed at an angle with respect to each other; and
FIG. 6 shows a further alternate arrangement wherein the reflecting surface of the maser material is tilted at an angle to the acoustic wavefront.

Referring to FIG. 1, there is shown, for purposes of explanation, a schematic representation of a maser amplifier in accordance with the principles of the invention. It is characteristic of a maser amplifier that it employs a medium in which there is established, at least intermittently, a nonequilibrium population distribution in a pair of spaced energy levels in its energy level system. In particular, the population of the higher of the selected pair of energy levels is made larger than that of the lower. It is now usual to describe a medium which is in such a state of nonequilibrium as exhibiting a negative temperature. If there is then applied to a medium which is in a negative temperature state a signal of a frequency which satisfies Planck's law with respect to the two energy levels which are in nonequilibrium, the applied signal will stimulate from the medium the emission of radiation at the signal frequency and the signal will be amplified.

The amplifier of FIG. 1 includes an elongated rod 10 of maser material whose radiative energy level separations correspond to frequencies within the range of interest. For the purposes of illustration, the range of interest is selected to be within the range of visible light for which a ruby material of a type described by A. L. Schawlow, "Fine Structure and Properties of Chromium Fluorescence in Aluminum and Magnesium Oxide," Advances in Quantum Electronics, Columbia University Press, New York, 1961, is advantageously used.

One end of rod 10 extends into a conductively bounded cavity 11 which is tuned to be resonant at the frequency of an acoustic wave that is to be launched along rod 10. The manner in which the acoustic frequency is selected will be explained in greater detail hereinafter. Cavity 11 is energized by means of a source of electromagnetic wave energy 12. Coupling between the electromagnetic energy in cavity 11 and the acoustic wave within rod 10 is effected by means of a transducer comprising a cap 13 of piezoelectric material, such as quartz, or any other suitable acoustic wave propagating material. Cap 13 is mounted at the end of the rod within cavity 11 in a region of high electric field intensity.

The opposite end of rod 10 is match-terminated both optically and acoustically by means of a first portion 14 of optically absorptive material, such as a black sapphire, and a second portion of acoustically absorptive material such as the wedge 15 of ruby material whose surfaces have been roughened.

A beam of wave energy at the signal frequency is applied to rod 10 through an aperture 16 in cavity 11 as indicated by arrow 17. Amplified wave energy leaving rod 10 is extracted through aperture 16 as indicated by arrow 18. The output light can then be diverted from the light source by any convenient means known in the art. For example, a circulator comprising an input polarizer, a polarization separator of the type shown on page 492 of "Fundamentals of Optics" by F. A. Jenkins and H. E. White, and a Faraday rotator can be used. The polarization separator passes the incident polarization established by the input polarizer which is then rotated 45 degrees by the Faraday rotator before entering the amplifier. The amplified output wave, polarized in the same direction, is passed through the Faraday rotator and rotated through an additional 45 degrees in the same sense as the incident wave for a total rotation of 90 degrees. This direction of polarization is not passed by the polarization separator but is, instead, reflected away from the signal source.

To achieve a negative temperature and thereby to effect maser action, the rod 10 is pumped by means of a suitable energy source (not shown) disposed about the rod. This is indicated by the arrows 19 directed towards rod 10. Alternatively, there can be used end pumping arrangements of the kind described in the copending application of W. S. Boyle and D. F. Nelson, Serial No. 134,776, filed August 29, 1961.

In the absence of an acoustic wave, the incident beam of signal wave energy (i.e., a light beam) propagates down the rod and is absorbed by the optical termination 14. However, in the presence of an acoustic wave, essentially all of the incident light is reflected from the acoustic wave train. The reflected power is at a frequency $$f_2 = f_1 - f_{ac} \qquad (1)$$

where $f_1$ is the frequency of the incident power,
$f_2$ is the frequency of the reflected power, and
$f_{ac}$ is the frequency of the acoustic wave.

In the presence of the acoustic wave, essentially no power is reflected at frequency $f_1$.

The operation of an amplifier in accordance with the invention can be understood by recognizing that the acoustic wave propagating along rod 10 produces a sinusoidally varying density wave along the rod. This is indicated by the broken lines 20 which are intended to represent propagating regions of maximum density. The refractive index and, hence, the dielectric constant of rod 10, also vary periodically in time and space in accordance with the density variations. Accordingly, the acoustically excited rod 10 can be considered as a distributed reactance varying sinusoidally in time and space. A detailed analysis of the use of such a time and space varying reactance as a means of coupling two electromagnetic propagating waves is given in an article entitled "Parametric Amplification and Frequency Mixing in Propagating Circuits" by P. K. Tien, published in the Journal of Applied Physics, vol. 29, No. 9, pp. 1347–1357 and consequently need not be repeated here. By analogy, reference can be made to that article for the methematical theory of parametric interaction of an electromagnetic wave (such as a light wave) and an acoustic wave as in the present invention.

In operation, a portion of the incident wave energy at frequency $f_1$ is reflected at the input end surface of the rod. If R represents the coefficient of reflection equal to the fraction of the incident power reflected at the input end of the rod, and $P_1$ is the total incident power, then an amount $P_1(1-R)$ enters the rod. Under the influence of the pumping power, the portion of the incident power entering the rod is amplified due to maser action. In addition, the acoustic wave train within the rod causes the electromagnetic energy to be reflected. It reappears at the input end of rod 10 as a power $$P_2 = P_1(1-R)G_{12} \qquad (2)$$

where $G_{12}$ is the net round trip gain at frequency $f_1$ in the forward direction and at frequency $$f_2 = (f_1 - f_{ac}) \qquad (3)$$

in the reverse direction.

A fraction $P_2R$ of the wave energy at frequency $f_2$ is reflected back into rod 10 at the input end, is amplified an amount $G_{23}$ and reappears at the input at a level $$P_3 = P_1(1-R)RG_{12}G_{23} \qquad (4)$$

at frequency $$f_3 = (f_1 - 2f_{ac}) \qquad (5)$$

This process continues, as indicated in FIG. 2. The latter is illustrative of the power and frequency relationships at the input end of rod 10.

The total power emerging from the amplifier is the sum of the sequence $$P_2(1-R) + P_3(1-R) + P_4(1-R) + \ldots \qquad (6)$$

or $$P_{out} = P_1(1-R)^2 G_{12}[1 + G_{23}R + G_{23}G_{34}R^2 + \ldots] \qquad (7)$$

where $G_{nm}$ is the gain factor for successively reflected waves.

As is evident, the behavior of the amplifier is determined by the successive gain factors $G_{12}, G_{23} \ldots$ and R, the fraction of the power reflected at the input of rod 10.

Referring to FIG. 3, which is a curve representing the frequency response of the maser, it can be seen that the successive gain factors have different magnitudes depending upon where within the response (or fluorescence line) the incident wave energy is introduced, the relative magnitude of $f_{ac}$ and the fluorescence line width $\delta$. Thus, the gain factors (which are proportional to the height of the fluorescence line) eventually fall off as the frequency shifts due to successive reflections.

If $P_{out}$ in Equation (7) is much less than the power that the pump can supply to maintain the negative temperature in rod 10, the amplifier is well below saturation. The gain can be made arbitrarily large by pumping harder or making the device longer. Because of the frequency shift experienced by the reflected light wave, however, oscillations will not occur irrespective of the relative values of the gain and R.

Referring again to FIG. 3, it is seen that over a range of frequencies the gain factor can be maintained substantially constant if the signal frequency is selected to fall within the peak portion of the fluorescence line and $f_{ac}$ is much less than $\delta$, since the height of the fluorescence line is relatively constant over this range of frequencies. Designating the gain factor as $g$ over this range, it is evident that if $g$ is large enough $gR$ can be greater than unity and successive reflections will increase in power. This process can continue until $g$ starts to decrease as the frequency shifts sufficiently and the height of the fluorescence line decreases. Beyond this point successive reflections will result in a power decrease. Hence, the reflection with the highest power out is selected as the useful amplified output signal from the device.

For any given amplifier there is an optimum R which gives maximum gain. For example, after four reflections with equal gain $g$, the power output $$P_5 = P_1 g^4 R^3 (1-R)^2 \qquad (8)$$

can be optimized by selecting $$R \cong 0.6 \qquad (9)$$

for which $$R^3(1-R)^2 \cong 1/30 \qquad (10)$$

If the gain per reflection is $g=10$, then, after four reflections, the total gain is equal to 330. It is seen that for this particular case it is desirable to have a large coefficient of reflection ($R=0.6$) at the input rather than a small coefficient of reflection as might be desirable in a reciprocal amplifier.

In the situation in which many reflections occur with roughly equal gain $g$, the device has some interesting saturation characteristics. For example, if the input signal is increased, or the pump power is decreased to a point where the sum of successive reflected powers would tend to become larger than the available power, clearly the gain must readjust itself to a lower value. Specifically, there is a range of operation over which the gain will limit itself to a value such that the product $gR$ is slightly less than unity. Thus, successive reflections will not build up (and thereby exceed the available power). Under these conditions of saturation successive terms of the output series, given by Equation (7), decrease slowly until they are negligible at a frequency where the gain $g$ has not changed materially. $P_{out}$ is then a convergent geometric series whose sum must be equal (neglecting losses) to the available power. That is $$P_{out} = \frac{P_1 g (1-R)^2}{1-gR} = P_{available} \qquad (11)$$

Any change in the equality effected by either changing the input power $P_1$ or the value of the available power (by changing the pump power) are accommodated by a slight change in the value of $gR$ which still, however, remains close to unity.

In an amplifier of this type operating at saturation, the signal is typically extracted after the first reflection. The gain $g$ remains approximately equal to $1/R$ over a wide range of input signal levels and pump power variations. While a prior art maser amplifier has its gain limited to this value as an upper limit, it must as a practical matter operate below this level of gain to avoid incipient oscillations. In addition, the gain of a prior art amplifier is sensitive to variations in the amplitude of the pumping power.

In the design of an amplifier in accordance with the invention, it is necessary to know the fluorescence line width $\delta$ (which is a function of the material and its operating temperature) and to ascertain the frequency of the acoustic wave to satisfy the phase requirements as will be explained in greater detail hereinbelow. As an example, we will complete the acoustic frequency for an amplifier using ruby maser material. Because high frequency acoustic waves are attenuated rapidly at room temperature, the ruby material is advantageously operated at liquid nitrogen temperature (or lower) at least at the end upon which the acoustic wave is launched. An arrangement for doing this is illustrated in FIG. 4.

The embodiment of FIG. 4 is essentially the same as the embodiment of FIG. 1 except that the acoustic wave and the electromagnetic wave are launched in the maser rod at opposite ends. More specifically, the amplifier comprises a rod 40 of maser material (such as ruby) one end of which extends into a cavity 41 which is excited at the frequency of the acoustic wave. The end of rod 40 within cavity 41 is terminated by means of a light absorptive material 42 and a transducer 43 for coupling between the electromagnetic wave energy in cavity 41 and the acoustic wave within rod 40. The entire cavity assembly is placed in a Dewar flask 44 and maintained at the temperature of liquid nitrogen ($T=77°$ K.). As illustrated, the acoustic wave is launched from the right, in the cooled portion of rod 40. As the acoustic wave enters the warmer portion of the rod, it is gradually attenuated and finally totally absorbed in the left end of rod 40.

The incident light at frequency $f_1$ is applied at the left end of rod 40, is reflected by the oncoming acoustic wave train and then reappears at the left end of rod 40 at a frequency $$f_2 = f_1 + f_{ac} \qquad (12)$$

Successive reflections gradually shift the reflected electromagnetic wave energy up in frequency such that after $m$ reflections the output frequency $f_0$ is given by $$f_0 = f_1 + m f_{ac} \qquad (13)$$

The frequency of the acoustic wave is advantageously chosen so that successive light reflections from the acoustic wave train add in phase to give a monotonically increasing reflected wave.

When the incident light and the acoustic wave propagate in the same direction, the reflected wave components add in phase when $$f_r = f_1 - f_{ac} \qquad (14)$$

and $$\beta_r = \beta_1 + \beta_{ac} \qquad (15)$$

When the incident light and the acoustic wave are launched in opposite directions, in phase addition occurs when $$f_r = f_1 + f_{ac} \qquad (16)$$

and $$\beta_r = \beta_1 + \beta_{ac} \qquad (17)$$

where $f_{ac}$ and $\beta_{ac}$ are the frequency and phase constants, respectively, of the acoustic wave, $f_1$ and $\beta_1$ are the frequency and phase constants, respectively, of the incident electromagnetic wave and of successive electromagnetic waves reflected from the input end of the maser rod, and $f_r$ and $\beta_r$ are the frequency and phase constants, respectively, of electromagnetic wave energy reflected by the acoustic wave.

Total reflection is achieved for values of $\beta$ which satisfy either Equation (15) or (17), depending upon the directions of propagation of the incident and acoustic waves. The reflectivity decreases as the values of $\beta$ deviate from that given by these equations. Accordingly, Equations (15) and (17) represent a preferred condition. It should be noted that in an amplifier in which there are a plurality of successive reflections from the acoustic wave, Equations (15) and (17) are preferably satisfied for each subsequent incident wave and each subsequent reflection wave.

The frequency relationship given by Equations (14) and (16) are, on the other hand, automatically satisfied.

To satisfy the $\beta$-condition for any given material, the frequency of the acoustic wave is selected as will be explained in the following illustrative example.

Because $f_1$ and $f_r$ differ in frequency by only a small amount, $\beta_1$ and $\beta_r$ are approximately equal in amplitude and are given by $$|\beta_r| \approx |\beta_1| = \frac{2\pi}{\lambda_{ruby}} = \frac{2\pi n}{\lambda_0} \qquad (18)$$

where $\lambda_{ruby}$ is the wavelength of the light wave in the ruby
$n$ is the index of refraction of ruby ($=1.76$), and
$\lambda_0$ is the wavelength of the light wave is free space.

Therefore, for the embodiment of FIG. 4

$$\beta_{ac} = 2\beta_1 \qquad (19)$$

and, from Equation (18)

$$\lambda_{ac} = \frac{\lambda_0}{2n} \qquad (20)$$

For ruby $\lambda_0 \approx 7000$ A. and, therefore, $\lambda_{ac} = 2 \times 10^{-5}$ cm.
Since $$f_{ac} \lambda_{ac} = v_{ac} \qquad (21)$$

where $f_{ac}$ is the frequency of the acoustic wave, $\lambda_{ac}$ is the wavelength of the acoustic wave in the ruby, and $v_{ac}$ is the velocity of propagation of the acoustic wave, and further nothing that $$v_{ac} \approx 3 \times 10^5 \text{ cm./sec.} \quad (22)$$

we get that $$f_{ac} \cong 15 \text{ kmc./sec.} \quad (23)$$

Since ruby at liquid nitrogen temperature has a fluorescence line width of approximately 0.5 wave numbers equal to 15 kmc. (which also happens to be equal to the acoustic frequency calculated above), it is apparent that only the incident wave at frequency $f_1$ and the first reflected wave at frequency $f_2 = f_1 + f_{ac}$ can fit into the 15 kmc. band over which substantial gain occurs. Thus, in the particular illustrative example given above, the power components for successive reflections at successively higher frequencies would be considerably smaller and, as a practical matter, can be neglected. At room temperature, the fluorescence line width in ruby increases to eight wave numbers (240 kmc.) and an overall gain from about 16 reflections can be realized. However, because of the higher attenuation of the acoustic wave at room temperature, more power at the acoustic frequency is necessary.

In the embodiments of FIGS. 1 and 4, power reflected by the acoustic wave, upon reaching the input end of the rod, is partially reflected and partially transmitted. The ratio of the power that is reflected at the rod end to the total power incident upon the rod end has been designated R. It will also be noted that in the embodiments of FIGS. 1 and 4 the rod end surfaces are perpendicular to the rod axis and the incident light beam and the acoustic wave are introduced so as to propagate along the rod in a direction substantially parallel to the rod axis. Other ararngements are possible, however. For example, in FIG. 5, the central portion 50 of the maser rod end is made totally reflective ($R \approx 1$). The incident light is introduced at an angle $\theta$ to the rod axis and to the direction of propagation of the acoustic wave through a region 51 of the end surface having a low coefficient of reflection.

The light strikes the acoustic wave at an angle, as shown, and is successively reflected until it emerges amplified and shifted in frequency by an amount determined by the number of reflections and the acoustic frequency. By making the major portion of the rod end totally reflective, the reflected wave energy incident upon the rod end due to successive reflections is substantially all reintroduced into the amplifier thereby producing a larger output power in a relatively short length of rod. The amplified light is extracted through a second region 52 of low reflectivity.

In an arrangement in which the directions of propagation of the light and the acoustic waves are not parallel, the $\beta$ terms must be expressed as vector quantities. That is $$\vec{\beta}_r = \vec{\beta}_i \pm \vec{\beta}_{ac} \quad (24)$$

and Equation (20) becomes $$\lambda_{ac} = \frac{\lambda_0}{2n \cos \theta} \quad (25)$$

It is evident that by varying the angle $\theta$, the acoustic frequency and the number of reflections can be varied to some extent, thus providing a convenient control. In addition, by introducing the light at an angle, the need for a circulator to separate the input and output signals is avoided.

In the design of an amplifier in accordance with the invention, the maser gain and reflection loss experienced by the light wave are proportioned to effect maximum gain in a reasonable length of rod. It can be shown that as much as 60 percent of an incident light wave can be reflected by the acoustic wave in a distance of N wavelengths if $$2N\left[\frac{\Delta n}{n \cos^2 \theta}\right] = 1 \quad (26)$$

where

N is the number of acoustic wavelengths, $n$ is the index of refraction, $\Delta n$ is the change in the index of refraction due to the acoustic wave, and $\theta$ is the angle between the direction of propagation of the light wave and the acoustic wave.

Assuming, for the purposes of illustration, that $\cos \theta = 1$ and that a reasonable value of $\Delta n/n$ is $4 \times 10^{-5}$, Equation (26) is satisfied when $N = 1.25 \times 10^4$ acoustic wavelengths. Since $\lambda_{ac} \approx 2 \times 10^{-5}$ cm., this corresponds to a length of 2.5 mm. or approximately 0.1 inch. Thus, the acoustic wave, at maximum intensity, causes incident light to undergo a reflection loss of about 30 decibels per inch. If the maser material is capable of producing a gain greater than 30 decibels per inch, the gain would exceed the reflection loss and the unreflected light wave would continue to grow at a rate given by the difference between the gain and the reflection loss. This, however, is an undesirable situation in that it can give rise to oscillations at the frequency of the incident light. Thus, in practice, it is preferable to keep the reflection loss greater than the gain and by adjusting the difference, arrange to have any given penetration of the sample and, therefore, any desired gain. One convenient way of accomplishing this is as shown in FIG. 4 where the intensity of the acoustic wave falls off rapidly as the wave train propagates along the rod 40 from the cold portion to the warmer portion and is rapidly attenuated. Thus, in the embodiment of FIG. 4, the light wave propagates over a substantial portion of rod 40, experiencing a substantial degree of amplification, before being reflected by the acoustic wave. An alternative method of controlling the gain of the amplifier, using a given length of maser material, is to increase the net reflection loss near the end of the rod by reducing the pump power and, therefore, the gain near that end.

Another parameter of the amplifier requiring consideration is the phase constant of the Doppler-shifted light wave. As indicated above by Equations (15) and (17), optimum reflection is realized when the phase constant of the acoustic wave is equal to the difference between the phase constants of each incident and each reflected light wave. In the general discussion above, it was assumed that the $\beta$-condition necessary for in-phase reflection could be satisfied and that the bandwidth was limited only by the width of the fluorescence line. This, however, is not generally accurate. It can be shown that the acoustic wave train can be regarded as a band-pass light filter with a bandwidth $2\Delta f_1$ between half power points of $$2\Delta f_1 = \frac{1.67 f_1}{W} \quad (27)$$

where $f_1$ is the frequency of the incident light wave, and

W is the number of wavelengths of an acoustic wave train having essentially constant reflections per wavelength.

The value for W is estimated by assuming that it roughly equals the number of wavelengths required to cause a three decibel reflection loss. For purposes of illustration, let it be assumed that the light travels 5 cm. along the wave train before reaching this three decibel point. Accordingly, $W = 5$ cm./$2 \times 10^5$ wavelengths. For $f_1 = 4 \times 10^{14}$ cycles per second, a bandwidth of 2.6 kmc. is obtained. Thus, for the particular example given herein, only one reflection from the acoustic wave would be possible since any light at frequency $f_2 = f_1 \pm f_{ac}$ reflected from the input end of the maser material would pass through the acoustic wave unaffected and be absorbed in the optical termination.

A simple method of increasing the frequency range over which the phase constants of the various waves are related in optimum fashion is shown in FIG. 6. In all the previous examples the angle between the direction of propagation of the acoustic waves and the direction of propagation of the incident and the successively shifted light waves has been constant. In the embodiment of FIG. 6, however, this angle is changed by a multiple of a small angle $\epsilon$ by tilting the plane of the input reflecting surface of rod 60 by an amount $\epsilon/2$ with respect to the acoustic wave front. Applying the technique of the embodiment of FIG. 5, the center portion 62 of end 61 is made totally reflective. The input wave is introduced at an angle $\theta$ to the direction of propagation of the acoustic wave and emerges after three reflections at an angle $\theta+2\epsilon$ with respect to the direction of the acoustic wave.

Rewriting Equation (25), the general formula for the preferred $\beta$-condition, in terms of frequency and setting the resulting equation equal to a constant K gives $$f_{light} \cos \theta = \frac{v_{light}}{2v_{ac}} f_{ac} = K \qquad (28)$$

Assuming Equation (28) is satisfied for $f_{light} = f_1$ and a particular angle $\theta$, it is readily shown that by adding constant increments to $\theta$ as the frequency $f_{light}$ is shifted by constant amounts in successive reflections, Equation (28) can be satisfied for a large number of reflections. That is, if $$f_1 \cos \theta = K \qquad (29)$$

it can be shown that there is a small angle $\epsilon$ such that $$(f_1 + mf_{ac}) \cos (\theta + m\epsilon) = K \qquad (30)$$

Combining Equations (29) and (30) we get $$\frac{\cos (\theta + m\epsilon)}{\cos \theta} = \frac{1}{1 + \frac{mf_{ac}}{f_1}} \qquad (31)$$

Therefore, since $mf_{ac}/f_1 \ll 1$ $$\cos m\epsilon - \tan \theta \sin m\epsilon = 1 - \frac{mf_{ac}}{f_1} \qquad (32)$$

For small values of $m\epsilon$ (i.e., $m\epsilon \ll 1$)

$$\epsilon = \frac{f_{ac}}{f_1 \tan \theta} \qquad (33)$$

which is true for all $m$ and any $\theta$.

If rod end 61 is ground with a tilt $\epsilon/2$ with respect to the normal to the rod axis and $\theta$ is made approximately equal to $\epsilon$, then Equation (33) gives $$\epsilon = \left(\frac{f_{ac}}{f_1}\right)^{1/2} \qquad (34)$$

For $f_{ac}$ equals 15 kmc. and $f_1$ equals $4 \times 10^5$ kmc., $\epsilon$ equals $6 \times 10^{-3}$ radians or $\epsilon$ equals 20 minutes of arc.

In practice the input angle $\theta$ is adjusted for gain at $f_1$ indicating that the $\beta$-condition is matched for $f_1$. The $\beta$-condition will then be automatically correct for all successive reflections.

In the various embodiments described above, the signal wave was characterized as a light beam. While the invention is primarily intended for use in the optical range of frequencies, it is to be understood that the principles of the invention are applicable at other operating frequencies. For example, by placing the maser material in a waveguide, an amplifier operative in the microwave range of frequencies can be realized.

In all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A traveling wave maser amplifier for amplifying electromagnetic wave energy over a range of frequencies comprising:
   an elongated negative temperature medium;
   means for pumping said medium to establish a negative temperature therein over said given range of frequencies;
   means for applying electromagnetic wave energy to said medium at a first frequency for propagation therealong within said range of frequencies;
   means for inducing an acoustic wave along said medium at a second frequency for propagation therealong in cumulative interaction with said electromagnetic wave and for producing within said medium electromagnetic wave energy at a third frequency;
   and means for extracting amplified electromagnetic wave energy from said medium at said third frequency.

2. A traveling wave maser amplifier for the amplification of signal wave energy comprising:
   an elongated element of active material which in the presence of pumping energy is capable of amplifying said signal wave by the stimulated emission of wave energy over a range of frequencies including the signal frequency;
   means for launching a propagating electromagnetic signal wave along said element;
   means for launching an acoustic wave along said element in a direction substantially parallel to said signal wave at a frequency different than said signal frequency;
   said acoustic wave and said signal wave energy interacting within said element to change the frequency of said signal wave energy;
   and means for extracting amplified wave energy from said amplifier at a frequency different than said signal frequency by an amount equal to an integral multiple of said acoustic wave frequency.

3. The combination according to claim 2 wherein:
   said element is an elongated rod;
   and wherein said acoustic wave and said signal wave are launched upon said rod at the same end.

4. The combination according to claim 2 wherein:
   said element is an elongated rod;
   and wherein said acoustic wave and said signal wave are launched upon said rod at opposite ends.

5. The combination according to claim 4 wherein:
   one end of said rod is cooled with respect to the other end of said rod;
   and wherein said acoustic wave is launched along said rod from said cooled end.

6. A traveling wave maser amplifier for the amplification of signal wave energy comprising:
   an elongated element of active material which in the presence of pumping energy is capable of amplifying said signal wave by the stimulated emission of wave energy over a range of frequencies including the signal frequency $f_s$;
   means for producing a propagating electromagnetic signal wave along said element at said signal frequency;
   means for producing an acoustic wave along said element at an angle $\theta$ with respect to said signal wave at a frequency $f_{ac}$;
   said acoustic wave and said electromagnetic wave energy propagating along said element and cumulatively interacting to produce electromagnetic wave energy at a different frequency;

and means for extracting amplified wave energy from said amplifier at said different frequency $$f_0 = f_s \pm (m) f_{ac}$$

where $m$ is the number of times the signal wave is reflected by said acoustic wave.

7. A traveling wave maser amplifier for the amplification of signal wave energy in the optical frequency range comprising:

an elongated rod of active material which in the presence of pumping energy is capable of amplifying said signal wave by the stimulated emission of wave energy over a range of frequencies including the signal frequency;

means for inducing an acoustic wave along said rod in a given direction;

means for directing a beam of electromagnetic signal wave energy through an end of said rod in a direction substantially parallel to said given direction, said end having a coefficient of reflection R;

said acoustic wave and said electromagnetic wave energy propagating along said rod and cumulatively interacting to produce electromagnetic wave energy at a frequency different than said signal frequency by an amount equal to an integral multiple of said acoustic wave frequency;

and means for extracting amplified wave energy from said amplifier at said different frequency.

8. The combination according to claim 7 wherein:

said acoustic wave and said applied beam are applied at the same end of said rod;

and wherein said amplified wave energy extracted from said amplifier has a frequency $f_0 = f_1 - (m) f_{ac}$, where $f_1$ is the frequency of the applied wave energy, $f_{ac}$ is the frequency of the acoustic wave and $(m)$ equals the number of reflections of said signal wave from said acoustic wave.

9. The combination according to claim 7 wherein:

said acoustic wave and said applied beam are applied at opposite ends of said rod;

and wherein the amplified wave energy extracted from said amplifier has frequency $f_0 = f_1 + (m) f_{ac}$, where $f_1$ is the frequency of the applied wave energy, $f_{ac}$ is the frequency of the acoustic wave and $m$ equals the number of reflections of said signal wave from said acoustic wave.

10. A combintaion according to claim 7 wherein:

the coefficient of reflection R is less than unity.

11. The combination according to claim 7 wherein:

the coefficient of reflection R is a minimum over a first region of said end through which said signal wave energy enters said rod and over a second region of said end through which said wave energy leaves said rod;

and wherein R is approximately equal to unity over the remaining surface of said end from which wave energy is internally reflected.

12. A traveling wave maser amplifier for the amplification of signal wave energy comprising:

an elongated rod of active material which in the presence of pumping energy is capable of amplifying said signal wave by the stimulated emission of wave energy over a range of frequency including said signal frequency;

said rod having an input reflecting end surface having a coefficient of reflection R with respect to said signal wave;

means for inducing an acoustic wave along said rod in a given direction whose wavefront is tilted with respect to the plane of said reflecting end surface by an angle $\epsilon/2$;

means for directing a beam of electromagnetic signal wave energy through said input end surface at an angle $\theta$ with respect to said given direction of propagation of said acoustic wave;

said signal wave and said acoustic wave propagating along said rod and cumulatively interacting to produce electromagnetic wave energy at a different frequency;

and means for extracting amplified wave energy from said amplifier.

13. The combination according to claim 12 wherein: the angle $\epsilon$ is given by $$\epsilon = \frac{f_{ac}}{f_1 \tan \theta}$$

for values of $m\epsilon$ much less than one, where $m$ is the number of reflections of the signal wave, $f_{ac}$ is the frequency of the acoustic wave and $f_1$ is the frequency of the signal wave.

References Cited by the Examiner
UNITED STATES PATENTS 3,012,204 12/61 Dransfeld et al. _____ 330—4
3,105,966 10/63 Jacobsen _____ 330—4

ROY LAKE, *Primary Examiner.*